United States Patent [19]
Chana

[11] Patent Number: 4,672,862
[45] Date of Patent: Jun. 16, 1987

[54] HYDRAULIC CONTROL SYSTEM INCLUDING A TORQUE SENSOR

[75] Inventor: Howard E. Chana, Troy, Mich.

[73] Assignee: General Motors Corporation, Detroit, Mich.

[21] Appl. No.: 823,018

[22] Filed: Jan. 27, 1986

[51] Int. Cl.⁴ .......................... B60K 41/04; F15B 5/00
[52] U.S. Cl. ........................................ 74/843; 74/867; 137/82
[58] Field of Search .................... 74/867, 843, 752 C, 74/862; 137/82

[56] References Cited
U.S. PATENT DOCUMENTS

| | | | |
|---|---|---|---|
| 3,971,396 | 7/1976 | Bentsen | 137/82 |
| 4,488,456 | 12/1984 | Taga et al. | 74/867 |
| 4,563,918 | 1/1986 | Sugano | 74/867 |

FOREIGN PATENT DOCUMENTS 2072772 10/1981 United Kingdom ................. 74/867

Primary Examiner—Allan D. Herrmann
Assistant Examiner—Martin G. Belisario
Attorney, Agent, or Firm—Donald F. Scherer

[57] ABSTRACT

A hydraulic control system including a torque sensor for producing a hydraulic signal proportional to torque transmission includes a control chamber or cavity which is supplied with fluid pressure through a plurality of restrictions or orifices from a pressure source. An accumulator is disposed between two of the restrictions such that the torque signal proportional to the pressure in the cavity is modulated or otherwise adjusted to accommodate the changing torque levels which occur as transients during the ratio interchanges in an automatic transmission.

3 Claims, 4 Drawing Figures

HYDRAULIC CONTROL SYSTEM INCLUDING A TORQUE SENSOR

BACKGROUND OF THE INVENTION

This invention relates to hydraulic control systems for automatic transmissions and more particularly to such systems having means for generating a hydraulic signal proportional to the torque transmitted.

SUMMARY OF THE INVENTION

It is an object of this invention to provide an improved hydraulic control system wherein a hydraulic pressure signal proportional to torque transmission is generated and controlled during transient torque conditions.

It is another object of this invention to provide an improved hydraulic control system including a torque sensor having a fluid chamber wherein the fluid delivered to the chamber means pass through two orifices with an accumulator intermediate the orifices such that the torque signal represented by the fluid pressure in the fluid delivered to the chamber will be controlled appropriately during transient torque conditions.

It is a further object of this invention to provide an improved hydraulic control system wherein a torque sensor is operable to generate a hydraulic pressure signal proportional to torque transmission and wherein the fluid pressure operable within the torque sensor must pass through two restrictions and operate on an accumulator such that the combination thereof is effective to control pressure changes which occur during rapid torque increases and decreases present during transient torque conditions.

These and other objects and advantages of the present invention will be more apparent from the following description and drawings.

DETAILED DESCRIPTION

Figure 1:
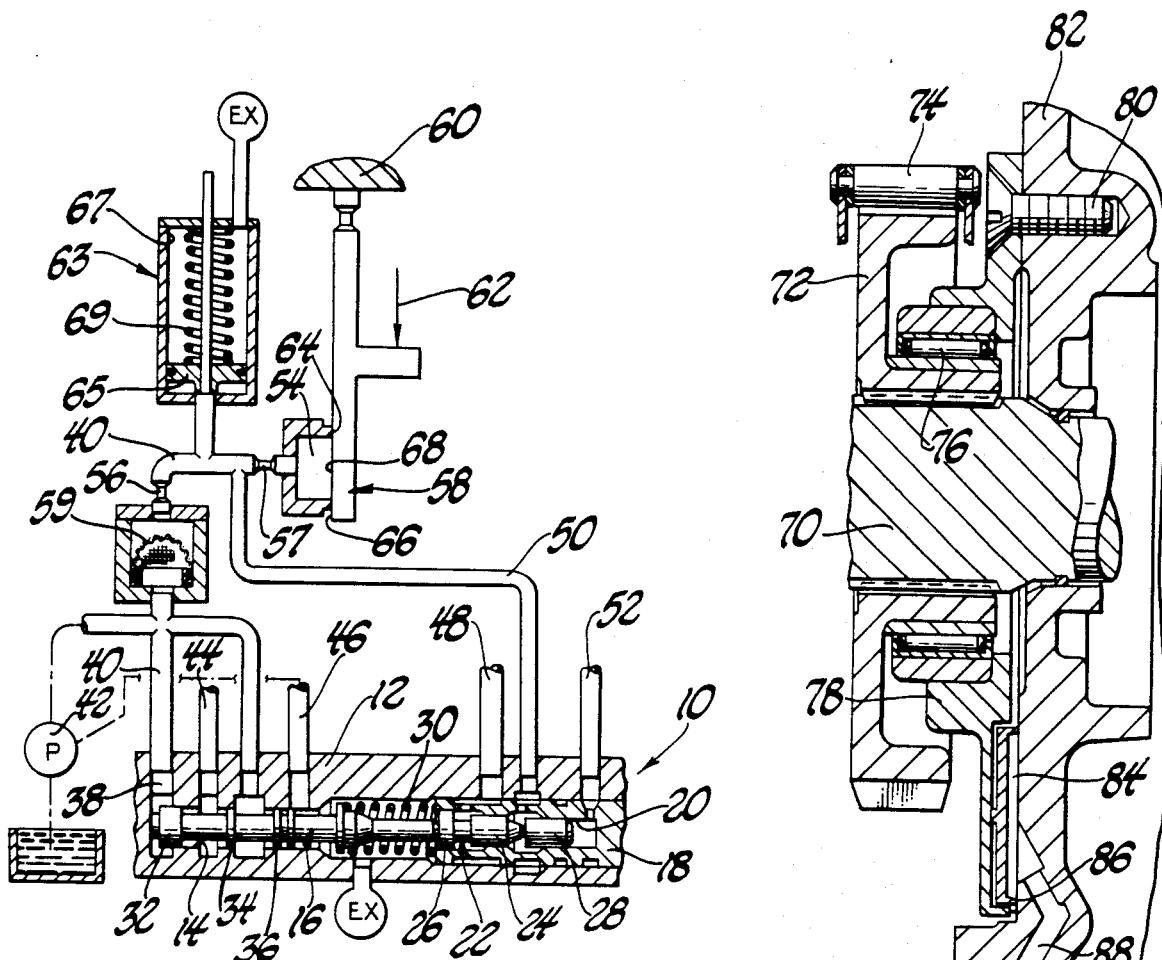
FIG. 1 is a diagrammatic representation of one embodiment of the invention.

Referring to the drawings, wherein like characters represent the same or corresponding parts throughout the several views, there is seen in FIG. 1 a pressure regulator valve, generally designated 10, having a valve body 12 with a valve bore 14 formed therein and a valve spool 16 slidably disposed in the valve bore 14.

Also disposed in the valve bore 14 is a bias pressure valve housing 18 having a stepped valve bore 20 in which is slidably disposed a spool valve 22 having a small land 24 and a large land 26 and a plug valve 28. A spring 30 is compressed between the valve housing 18 and the end of valve 16 to provide a bias on the valve spool 16. The valve spool 16 has spaced equal diameter lands 32, 34 and 36.

The valve land 32 cooperates with valve bore 14 to provide a pressure chamber 38 which is in fluid communication with a main pressure line 40. The main pressure line 40 is connected to the valve bore 14 intermediate lands 34 and 36, in the position shown, and is also connected to a conventional fluid pump 42 which is the source of pressure for the fluid system. The space between valve lands 32 and 34, in the position shown, is connected to a passage 44 which may be connected to a conventional torque converter in a well-known manner.

The valve bore 14 is also connected to a fluid passage 46 which may be connected either to exhaust or to the control chamber of a variable displacement type pump. The differential area between lands 24 and 26, of spool valve 22, is connected to a passage 48 which may be connected to a conventional control system in which a reverse bias is utilized to increase the system pressure. The space between spool valve 22 and plug valve 28 is connected to a fluid passage 50 which supplies a bias pressure to the regulator valve in proportion to the torque transmitted by the drive system which will be explained later. The space between the end of valve bore 20 and plug valve 28 is connected to a passage 52 which may also be connected to a conventional transmission control system, not shown, which will provide a bias pressure for regulator valve 10 during intermediate or low drive.

Fluid pressure in passage 40 operates on the left end of valve spool 16 to urge the valve spool to the right, as viewed in FIG. 1, until there is sufficient system pressure to move the valve spool 16, against spring 30, to open passage 40 to passage 44 between lands 34 and 32 such that excess fluid pressure is distributed to the torque converter. Further rightward movement, upon further increase in pressure in passage 40, causes the opening of passage 40 to passage 46 between lands 34 and 36 such that excess fluid is either exhausted or returned to a variable displacement control on a pump so as to reduce fluid output in the pump to maintain the pressure and fluid flow desired. The bias pressure provided in passages 48, 50 and 52 serve to increase the fluid pressure required in passage 40 to cause the rightward movements of the valve spool 16 as explained above.

For example, when reverse drive is actuated in the transmission, passage 48 is pressurized so that the bias force, which must be overcome by pressure in passage 40, consists of fluid pressure in passage 48 plus the force in spring 30. The passage 50 is in fluid communication with a chamber 54 which chamber 54 is also in fluid communication with passage 40 through an increasing torque restriction or orifice 56 and a decreasing torque restriction or orifice 57. An inline filter 59 is positioned in passage 40 to prevent particles from entering the system. The chamber 54 is closed by a bearing support member 58 which is mounted at 60 and is rotated in a clockwise direction about the member by a force 62 which is proportional to the torque transmitted.

Also connected to the passage 40 intermediate the restrictions 56 and 57 is an accumulator generally designated 63. The accumulator 63 is conventional in design and therefore includes a piston 65 slidably disposed in a cylinder 67 and urged in one direction by a spring 69. As is well-known, the piston 65 will be moved in the cylinder 67 as determined by the higher force attributable to either the fluid pressure in passage 40 or the spring 69.

The chamber 54 is preferably circular in cross section and has a sealing edge 64 which seals against the surface 66 of the bearing support member 58. As the bearing support member 58 is urged in a clockwise direction, the sealing forces on edge 64 increase in proportion to the force 62. Thus, the sealing force is proportional to the torque transmitted. The fluid pressure in chamber 54 is supplied from the pump 42 and acts on the surface 68 of support 58 which is adjacent to chamber 54.

The pressure in chamber 54 will increase until there is sufficient force to counteract the force 62 thereby providing sufficient separation between the surfaces 64 and 66 to permit the fluid in chamber 54 to exhaust at a controlled rate. The controlled exhausting of chamber 54 will permit the pressure therein to be less than the pressure in passage 40 since the fluid pressure input to chamber 54 is controlled by the fixed restriction 56 while the outlet is controlled by a variable restriction. The pressure in chamber 54 therefore is proportional to the torque transmitted and, since passage 50 is connected to chamber 54, the pressure in passage 50 is proportional to the torque transmitted. The pressure in passage 50 acts upon the end of valve land 24 of valve 22 and is therefore a bias force to assist in controlling the pressure level in passage 40. Thus, the pressure in passage 40 is proportional to the torque transmitted also.

However, during transient torque conditions, such as during ratio interchange, the pressure in chamber 54 has a tendency to undergo rapid change. The changing pressure is not always indicative of the torque level which is present from a control standpoint. As is well-known, the transient torques can either be increasing or decreasing depending upon the transmission change which is occurring.

During increasing torques, the pressure in passage 50 and chamber 54 will have a tendency to increase. The accumulator 63 will be operable to permit a more gradual change in the pressure in the passage 50 between the restrictions 56 and 57 such that the pressure in passage 40 will not fluctuate rapidly. Therefore, the system pressure, as represented by the pressure at the pump 42, will not undergo rapid fluctuations. This will permit the maintenance of the friction devices at the proper pressure levels during the transient torque conditions.

Should the main system pressure increase too rapidly, the torque capacity of a friction device such as a clutch might be greater than the torque being actually transmitted. This would result in a harsh shift. Likewise, an offgoing friction device might need a higher pressure to prevent engine flare due to early friction device release. Such a phenomena could occur during a downshift which is normally accompanied by a decreasing transient torque.

Figure 2:
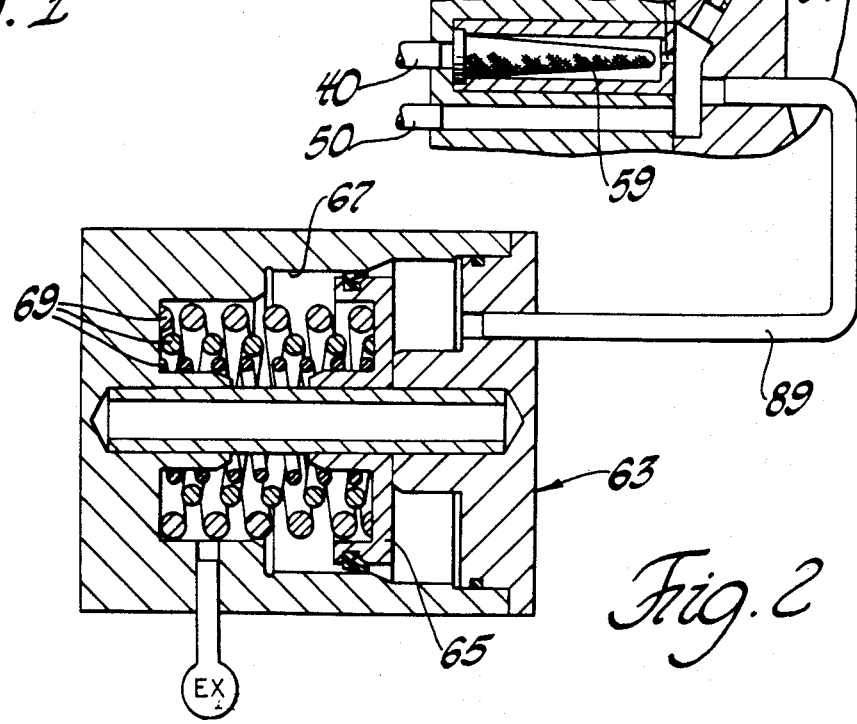
FIG. 2 is a partial elevational view of a torque transmitting mechanism incorporating the embodiment of FIG. 1.

The structure shown in FIG. 2 is a chain drive which is similar to the conventional chain drive used in drop center transmissions or front wheel drive transmissions which are commercially available. The chain drive has a shaft 70 which is driven by a torque converter, not shown, and on which is splined a sprocket 72 which drives a chain 74. The chain 74 transmits the drive torque to a second sprocket on an axis, not shown, displaced from the axis of shaft 70.

The sprocket 72 is supported on a roller bearing assembly 76 which is supported in a bearing housing 78. The bearing housing 78 is secured by a threaded fastener 80 to a stationary transmission housing 82. The bearing housing 78 has chamber 84 formed therein which is surrounded by an annular sealing surface 86. The chamber 84 is in fluid communication, through a passage 88, filter assembly 59 and restriction 56 with passage 40 and also with passage 50.

The decreasing torque restriction 57 is disposed in the passage 88. For simplicity of manufacture, the restriction 57 is formed in a cup plug which is then pressed into the passage 88 between the increasing torque restriction 56 and a passage 89 which communicates with the accumulator 63. The accumulator 63 is shown as including a plurality of springs 69. The use of more than one spring 69 in the accumulator 63 permits a wide range of control pressures to be designed for use in a given accumulator size by simply changing one or more of the springs.

The passages 40 and 50 are connected in a fluid system as shown in FIG. 1. The torque moment into the chain develops a chain tension force which is transmitted to bearing 76 such that a couple or torque moment is placed on the housing 78 proportional to the torque transmitted by the chain 74. The couple or torque moment is supported by the fluid pressure in chamber 84. As explained previously in FIG. 1, the fluid pressure in the chamber 84 will cause controlled separation between the annular surface 86 and the transmission housing 82 to permit controlled exhausting of fluid pressure within the chamber 84 thereby controlling the fluid pressure in passage 50. Since the force necessary to balance the torque movement on bearing support housing 78 is proportional to torque transmitted, the fluid pressure in chamber 84 and therefore passages 88 and 50 will be proportional to the torque transmitted.

The embodiment shown in FIGS. 1 and 2 has the accumulator 63 disposed such that it has a direct effect on the pressure in the passage 50. Therefore, the pressure in passage 50 acting on the end of valve land 24 will affect the system pressure in accordance with the influence of the accumulator 63. Thus, during periods of transient torque which occur during a ratio upshift or downshift, the system pressure is modulated by the accumulator 63 and does not undergo rapid pressure fluctuations.

During decreasing torque, the accumulator 63 acts in concert with the restriction 57 to prevent a rapid decay of the pressure in passage 50. Since the pressure in passage 50 is indicative of the torque being transmitted, it is also modulated by the accumulator 63 during transient periods. This pressure might be termed "the accumulated torque sensing pressure".

Figure 4:
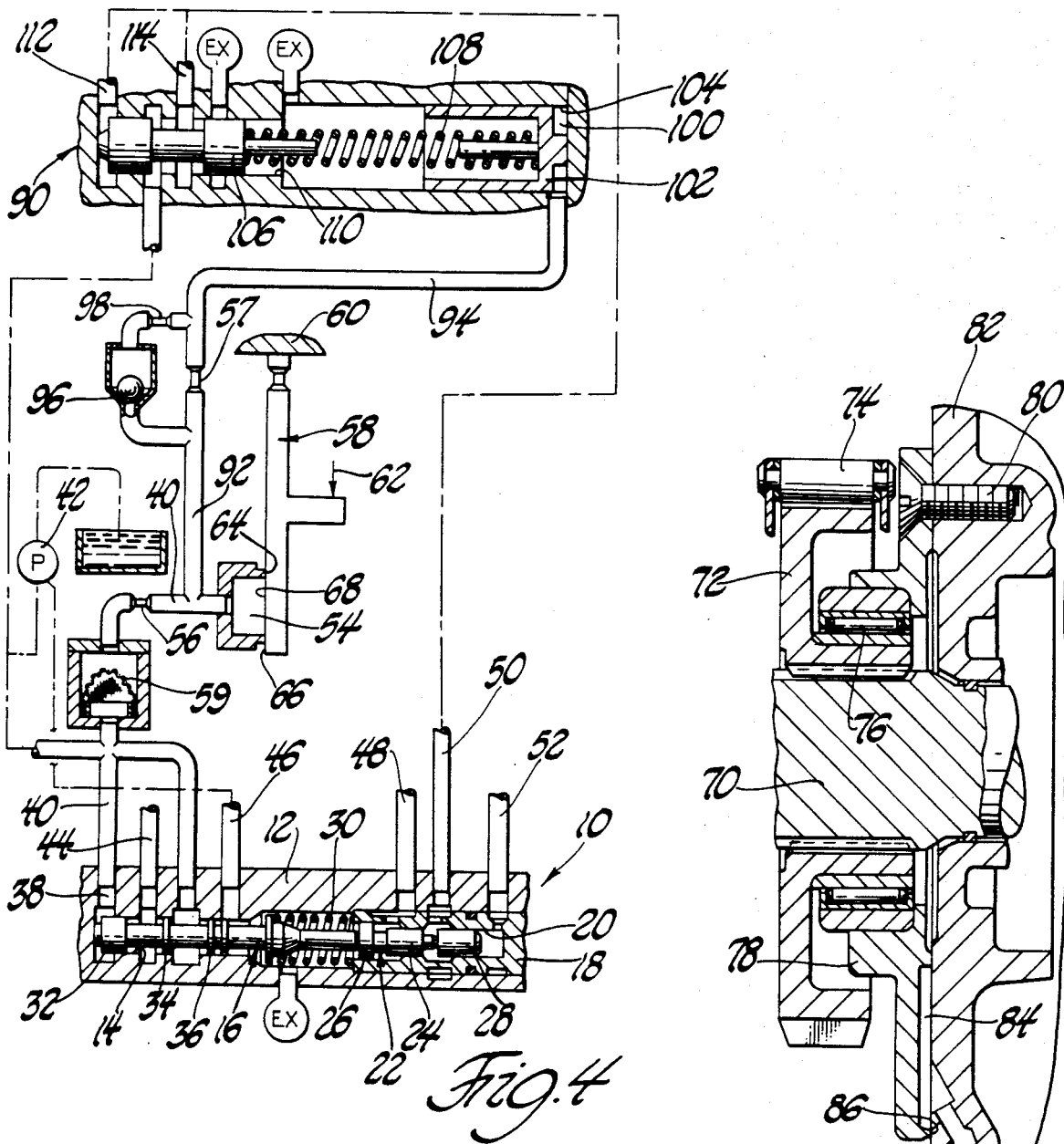
FIG. 4 is a diagrammatic representation of the embodiment of the invention shown in FIG. 3.
Figure 3:
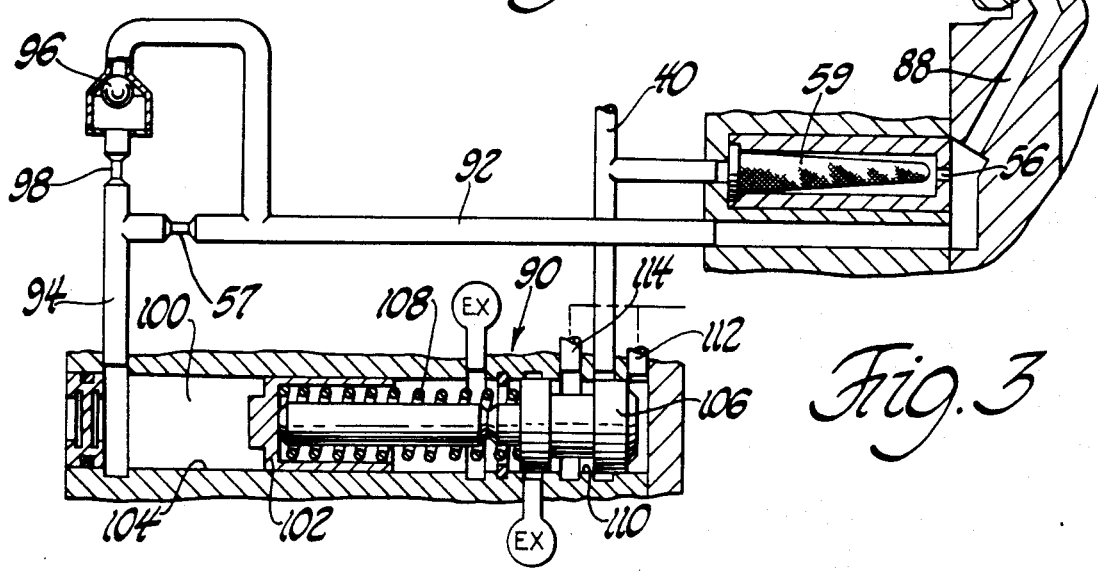
FIG. 3 is a partial elevational view of a torque transmitting mechanism incorporating another embodiment of the invention.

The system described in FIGS. 3 and 4, is similar to that described above in FIGS. 1 and 2, however, an additional valve member has been added to the system. This valve member is designated 90 and will hereinafter be referred to as "the accumulated torque sensing valve".

As best seen in FIG. 4, the passage 92 branches from the passage 40 downstream of the increase torque control orifice 56 prior to the chamber 54. Thus, the pressure in passage 92 is essentially the same as the pressure in chamber 54. The passage 92 is connected to an accumulator passage 94 through the decrease torque control orifice 57 and a parallel circuit incorporating a ball check valve 96 and a secondary increase torque control orifice or restriction 98.

The passage 94 is in fluid communication with a chamber 100 which is formed by an accumulator piston 102 slidably disposed in a bore 104. The accumulator piston 102 is operatively connected to a dual land spool valve 106 through a spring 108. The spool valve 106 is a component of the accumulated torque sensing valve 90 which also includes a valve bore 110 in which the valve spool 106 is slidably disposed.

The valve bore 110 is in fluid communication with the fluid pressure discharged from the pump 42 upstream of the filter 59. The valve bore 110 is also in fluid communication at two locations 112 and 114 with the accumulated torque sensing passage 50. The fluid pressure from pump 42 is admitted to the valve 90 and is controlled by the valve spool 106 for distribution to the passages 112 and 114 and therefore passage 50. The fluid pressure in passage 112 acts on the left end of valve spool 106 to move it rightward against the force in spring 108 to discontinue communication between pump discharge pressure and the passage 114. The valve bore 110 is in communication with an exhaust passage.

The valve 90 is essentially a downstream pressure regulator valve which is operative to provide a pressure which is reduced from the discharge pressure from pump 42 to a value determined by the force in spring 108. Such valve operation is, of course, wellknown. The force in spring 108 is responsive to the position of the accumulator piston 102 which is operative to move leftward on increasing torque responsive pressures as signaled by a rise in pressure passage 92 and rightward on the decrease of such pressure. The pressure rise in passage 92 which occurs with an increase in torque transmission is controlled by the restriction 56 which is operative to control the fluid flow dependent upon the pressure differential across the restriction.

The restriction 98 is operative to control the fluid flow from the passage 92 to the accumulator chamber 100 through the ball check valve 96 which is freely open to fluid flow in that direction. The restriction 98 is designed to be larger than the restriction 57 such that on increasing pressure the restriction 98 will be controlling. On decreasing pressure, however, the ball check valve 96 will be seated such that fluid flow from the chamber 100 to the passage 92 must pass through the restriction 57.

In accordance with the above discussion, the pressure in passage 50 will increase on increasing torques and will decrease on decreasing torques due to the action of the accumulator piston 102. The speed with which the accumulator piston 102 moves leftward is determined by restrictions 56, 57 and 98. The speed with which the accumulator piston moves rightward is determined by the restriction 57. Obviously, the restriction determined by the force 62 acting on the support member 58 will also enter into the determination of the pressure in passage 50.

From the above description, it is apparent that the fluid pressure in the passage 50 is responsive to the pressure in the cavity 54 of the torque sensor and is therefore a torque sensing pressure. However, this pressure is also sensitive to the accumulator 90 such that it might be termed the accumulated torque sensing pressure.

In FIG. 3, the system is shown as being incorporated in a transmission which utilizes a chain drive from the engine axis to the drive axis and is similar to that described previously for FIG. 2. In the system of FIG. 3, however, the decrease torque control restriction 57 is positioned in passage 92, rather than passage 88, downstream from the increasing torque control restriction 56. The accumulator used in FIG. 3 operates with a single spring 108 rather than utilizing the multiple springs which were used in the structure shown in FIG. 2.

The system shown in FIGS. 3 and 4 does provide for a more closely controlled system pressure, however, it has been found that in most installations, the simple structure of FIG. 2 works very well. Both structures utilize the same principle for operation, that is, an increased torque control restriction, a decreased torque control restriction, and an accumulator disposed between the restrictions.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A hydraulic control mechanism for a torque transmitting device comprising in combination; a source of fluid pressure; torque sensing means including a chamber having a fluid pressure therein proportional to the torque transmitted by said device; valve means for regulating the fluid pressure at said fluid pressure source; fluid passage means for communicating fluid from said source to said chamber; said passage means including torque increase flow restriction means and torque decrease flow restriction means; fluid accumulator means in fluid communication with said passage means at a position downstream of said torque increase flow restriction and upstream of said torque decrease flow restriction; the fluid pressure in said passage means between said flow restrictions being operable on said valve means to cause a change in the pressure level of said source proportional to the torque transmitted and said accumulator means being effective in combination with said flow restrictions to delay any rapid change in the pressure level of said source during rapid torque changes at said torque transmitting device when transient torques are present.

2. A hydraulic control mechanism for a torque transmitting device comprising in combination; torque input means; torque output means; chain drive means between said input and output means; a source of fluid pressure; torque sensing means being disposed for rotatably supporting one of said input and output means and having imposed thereon a reaction force proportional to the torque transmitted by said chain drive means and including a chamber having a fluid pressure therein proportional to the reaction force; valve means for regulating the fluid pressure at said fluid pressure source; fluid passage means for communicating fluid from said source to said chamber; said passage means including torque increase flow restriction means and torque decrease flow restriction means; fluid accumulator means in fluid communication with said passage means at a position downstream of said torque increase flow restriction and upstream of said torque decrease flow restriction; an accumulated torque sensing pressure in said passage means between said flow restrictions being in fluid communication with said valve means and being operable on said valve means to influence the pressure level of said source to a value proportional to the torque transmitted, and said accumulator means being effective in combination with said flow restrictions to delay any rapid change in the pressure level of said source during rapid torque changes at said torque transmitting device when transient torques are present.

3. A hydraulic control mechanism for a torque transmitting device comprising in combination; a source of fluid pressure; torque sensing means including a chamber having a fluid pressure therein proportional to the torque transmitted by said device; valve means for regulating the fluid pressure at said fluid pressure source including system regulator valve means for determining system pressure and accumulated torque sensing valve means for determining an accumulated torque sensing pressure; fluid passage means for communicating fluid from said source to said chamber; said passage means including torque increase flow restriction means and torque decrease flow restriction means; fluid accumulator means in fluid communication with said passage means at a position downstream of said torque increase flow restriction and upstream of said torque decrease flow restriction; said accumulator being operable to effect a change in the accumulated torque sensing pressure in response to changes in the torque transmission level in accordance with the fluid pressure in said passage means between said flow restrictions, and said accumulator means being effective in combination with said flow restrictions to delay any rapid change in the accumulated torque sensing pressure level of said valve means during rapid torque changes at said torque transmitting device when transient torques are present.

* * * * *